United States Patent Office 3,460,965
Patented Aug. 12, 1969

3,460,965
PROCESS FOR INCREASING THE CHEMICAL RESISTANCE OF ORGANIC PRODUCTS
Robert E. Anderson, Midland, and Albert J. Gouin, Bay City, Mich., assignors to The Dow Chemical Company, Midland, Mich., a corporation of Delaware
No Drawing. Filed Sept. 13, 1965, Ser. No. 487,053
Int. Cl. D21h 1/30; B44d 1/092
U.S. Cl. 117—47         10 Claims

ABSTRACT OF THE DISCLOSURE

This invention relates to a process for increasing the resistance of organic products to chemical degradation and to the resulting modified products. By coating or impregnating a cellulosic or synthetic organic polymer with a solution of a chloromethyldiphenyl ether and thereafter polymerizing the chloromethyldiphenyl ether in situ, the properties of the treated product are remarkably improved, particularly its acid resistance. In addition the process provides a means for incorporating useful ion-exchange or other functional groups into the modified product.

---

Background coatings have long been used to protect solid structures against chemical degradation. The modification of cotton, wood and other cellulosic materials useful in textile and paper products has been widely explored. Yet research continues. The present invention adds another useful technique for protecting such materials as paper, clothing, filter cloths, and plastic films from attack by sulfuric acid, nitric acid, concentrated sodium hydroxide and similar strong, corrosive reagents. The process is adaptable to conventional process equipment. It can be used with a wide variety of natural and synthetic organic polymers including cellulose, nylon, polyethylene, polypropylene, polyurethane, polyvinylchloride, and polyesters. It is particularly useful when the polymeric organic substrate has a relatively large surface area as in a film, fiber or cloth.

More specifically, it has been discovered that the chemical resistance of solid organic polymers is markedly improved by a process that comprises: (A) applying to the organic polymer a solution of a chloromethyldiphenyl ether containing an average of 1.0–4.0 chloromethyl groups per molecule in a $C_1$–$C_3$ chlorinated aliphatic solvent and thereafter (B) heating the treated polymer to polymerize the chloromethyldiphenyl ether in situ. Also with cellulose textile products and other similar organic products which are particularly sensitive to the byproduct HCl, it is desirable to pretreat the product with an inorganic HCl acceptor prior to applying the chloromethyldiphenyl ether solution.

The resulting treated organic polymer has a greatly improved chemical resistance yet retains its initial physical form and most of its tensile strength, impact resistance, and other desirable physical properties. Furthermore the coating obtained by the in situ polymerization usually contains residual reactive chloromethyl groups. By amination or other similar reaction, the residual chloromethyl groups can be converted into useful ion-exchange or other functional groups to enhance further the properties of the treated organic polymer.

For example, a cotton percale pretreated with sodium carbonate, impregnated with the chloromethyldiphenyl ether solution, and then heated to polymerize the chloromethyldiphenyl ether usually has a rather stiff and harsh hand. By reacting the residual chloromethyl groups with a tertiary alkylamine to convert them into quaternary ammonium groups, a softer, more flexible product is obtained with amazing chemical resistance. The treated cotton percale remains intact after being immersed in concentrated sulfuric acid for more than an hour while the initial, untreated cotton percale is destroyed within a few minutes. Furthermore this acid resistance is retained after repeated laundering.

It has also been found that the residual chloromethyl groups can be converted into other useful functional groups such as cationic amino or sulfonium groups by reaction with appropriate reagents to produce fibers, fabrics and membranes having a moderate ion-exchange capacity. Anionic groups can also be obtained.

The composition of the natural or synthetic organic polymer substrate is not critical provided that it has adequate initial resistance to the HCl evolved during the in situ polymerization. With acid sensitive materials such as cellulosic textile products, pretreatment with an HCl acceptor has been found to minimize degradation during the polymerization. Also the form and shape of the initial organic polymer is not critical. For example, it can be a flexible or rigid foam, a tube or bundle of fibers, a thread or a rod, a woven or non-woven fabric or mat, a cast film or finely-divided pellets. Because of the outstanding chemical resistance, products of the modified natural or synthetic organic polymers are particularly valuable in filter cloths, chemically resistant clothes, membranes for batteries, fuel cells or dialysis, and similar applications involving exposure to strong acid or base.

The term synthetic organic polymer as used herein includes polymers and copolymers prepared by vinyl polymerization such as polyvinylchloride, polystyrene, and polymethacrylates; by olefin polymerization such as polyethylene, polypropylene and polyisobutylene; by condensation polymerization such as polyamides, polycarbonates, polyesters and also polyurethanes and phenol-formaldehyde resins.

The process is also applicable to natural organic polymers, particularly to cellulosic products. The term cellulosic products includes textile fibers, thread and yarn as well as knitted or woven cloth and fabrics prepared from natural or regenerated cellulose such as cotton, ramie or rayon. Also included are textile products prepared from blends of cellulosic fibers with other natural or synthetic fibers since the improved properties of the treated cellulosic fiber can be usefully combined with the properties of the other fibers. In addition it encompasses paper, cardboard, plywood and similar non-woven cellulosic products prepared from cellulose fibers or pulp and also products of wood. Its effect is less pronounced when applied to wool, silk and other proteinaceous materials which have inherently a fairly high acid resistance.

Chloromethyldiphenyl ether (CMDPE)

The improved properties of the treated cellulosic or synthetic organic polymer result from modification of the polymer substrate by the in situ polymerization of a chloromethyldiphenyl ether containing an average of 1.0–4.0 chloromethyl groups per molecule. Suitable chloromethyldiphenyl ethers are readily obtained by chloromethylation of diphenyl ether preferably as described by Doedens in U.S. Patent 2,911,380. Since chloromethylation occurs largely at the 2- and 4-positions of each aromatic ring, the chloromethylation product is predominately a mixture having an average of up to about 4.0 chloromethyl groups per molecule. A higher degree of chloromethylation is difficult to achieve without undesirable crosslinking. Its exact composition is dependent on the reaction conditions, particularly the proportion of chloromethylating agent employed.

Several typical compositions obtained by chloromethylation of diphenyl ether are given in Table 1. Note that the mixtures contain 2- and 4-chloromethyldiphenyl ether as well as higher derivatives. Such compositions are often conveniently characterized by the weight percent active chlorine, e.g., CMDPE-17, CMDPE-33, etc.

TABLE 1.—CHLOROMETHYLDIPHENYL ETHER (CMDPE) COMPOSITIONS

| | | | | | | |
|---|---|---|---|---|---|---|
| Wt. percent Cl | 17.6 | 22.0 | 25.2 | 28.0 | 33.7 | 1·93 |
| Mole Ratio: ClCH$_2$—/DPE | 1.10 | 1.55 | 1.85 | 2.20 | 3.00 | 3.3 |
| Composition (mole percent): | | | | | | |
| Diphenyl ether (DPE) | 17.3 | 13.8 | 0 | 0 | 0 | 0 |
| 2-chloromethyl DPE | 5.3 | 3.3 | 0.3 | 0 | 0 | 0 |
| 4-chloromethyl DPE | 42.9 | 24.9 | 2.4 | 1.5 | 0 | 0 |
| 2,4'-bis(chloromethyl)DPE | 10.8 | 15.2 | 17.7 | 17.7 | 0.1 | 0 |
| 4,4'-bis(chloromethyl)DPE | 20.6 | 35.5 | 68.5 | 50.2 | 9.3 | 1 |
| Tris(chloromethyl)DPE [1] | 2.3 | 5.1 | 10.5 | 26.7 | 63.4 | 55.5 |
| Tetrakis(chloromethyl)DPE [2] | <1.0 | 1.0 | <1.0 | 1.6 | 21.9 | 43.0 |

[1] Predominately 2,4,4'-tris(chloromethyl)DPE, M.P. 57-8° C. with small amount of 2,2',4-tris(chloromethyl)DPE.
[2] 2,2',4,4'-Tetrakis(chloromethyl)DPE, M.P. 78-81° C.

For use in the present process, pure mono-, bis-, tris-, and tetrakis(chloromethyl)diphenyl ether can be isolated from the chloromethylation product. However, the mixed chloromethyldiphenyl ether having an average of about 1.0–4.0 chloromethyl groups per molecule of diphenyl ether is often advantageously used. Theoretically only one chloromethyl group per molecule ether is required to obtain a linear polymer. But because of cross-linking and possible chemical interaction with the substrate polymer, usually about 1.1–1.2 chloromethyl groups per molecule are consumed during the in situ polymerization. Residual, unreacted chloromethyl groups remain as sites for further chemical modification of the product.

Catalyst

Thermal polymerization of a chloromethyldiphenyl ether containing at least 1.0 chloromethyl group per molecule occurs readily at a temperature of about 120° C. or higher with evolution of HCl and formation of a methylene bridge with a second diphenyl ether molecule or other suitable reactant. This polymerization is promoted by Lewis acid catalysts. With a catalyst such as aluminum chloride, ferric chloride, stannic chloride, stannous chloride, zinc chloride, or ferric phosphate, in situ polymerization can be readily obtained at 80°–120° C. Particularly suitable for general use is a 50 percent solution of ferric chloride in methanol, a solution which is completely miscible with the preferred solutions used to treat or impregnate the organic substrate.

Usually a catalyst concentration of 0.1–5.0 weight percent based on chloromethyldiphenyl ether is adequate. However, both the catalyst concentration and the temperature are important factors in determining the rate of the in situ chloromethyldiphenyl ether polymerization. Below about 80° C., even the catalyzed polymerization is too slow for most practical purposes. With a Lewis acid catalyst such as FeCl$_3$ or SnCl$_4$ a polymerization temperature of about 90°–120° C. is generally effective. Indeed with FeCl$_3$ or SnCl$_4$, essentially complete polymerization can be obtained in less than 5 minutes at 100°–110° C. Higher temperatures can be used within the limits of the thermal-stability of the material being processed.

Solvent

To achieve a rapid and substantially uniform contact of the chloromethyldiphenyl ether and catalyst with the available surfaces of the cellulosic or synthetic organic polymer, use of a solution of the chloromethyldiphenyl ether and catalyst in a suitable solvent or diluent is desirable. The diluent should be substantially inert under normal process conditions and preferably have a boiling point below the polymerization temperature. Particularly suitable are C$_1$–C$_3$ chlorinated aliphatic solvents such as methylene chloride, ethylene dichloride, propylene dichloride, chloroform and carbon tetrachloride. Preferred is a solution of the chloromethyldiphenyl ether and a catalytic amount of ferric chloride or stannic chloride in methylene chloride.

HCl acceptor

HCl is evolved as a by-product of the in situ polymerization of the chloromethyldiphenyl ether and the reaction must be carried out in equipment properly designed for its control. However, because of the rapid polymerization and acid resistance of the resulting product, many organic polymers and even thin tissue paper can be processed without serious degradation from contact with the byproduct HCl. But in treating acid sensitive materials, particularly cellulosic textile products, pretreatment of the ntaural or synthetic organic polymer with an appropriate HCl acceptor is desirable to minimize acid degradation during the in situ polymerization. For ease of application particularly with cellulosic products, water-soluble inorganic HCl acceptors are preferred. Particularly suitable is a water-soluble inorganic base such as sodium carbonate, potassium bicarbonate, calcium hydroxide, sodium phosphate, sodium borate and other common alkali or alkaline earth bases which will rapidly neutralize the evolved HCl.

In practice a 10–20 percent aqueous solution of sodium carbonate or 4–10 percent aqueous sodium hydroxide is preferred in pretreating a cellulosic product. After drying the resulting product should desireably contain 0.5–5.0 weight percent, preferably about 2–4 weight percent, of the inorganic HCl acceptor. Although this quantity of retained base is equivalent only to about 5–20 percent of the theoretical byproduct HCl, it has been found adequate to minimize acid degradation during the in situ polymerization.

Process conditions

In practice treatment of the cellulosic or synthetic organic polymer with an inorganic HCl acceptor if required and with the mixture of chloromethyldiphenyl ether and catalyst is conveniently carried out at about room temperature using conventional processing techniques to obtain thorough contact of the product with the reactant solutions. For textile materials a padding machine is very suitable since the amount of reactants applied can be controlled by the initial solution concentration and adjustment of the squeeze rolls.

To obtain rapid and uniform impregnation or contact of the cellulosic or synthetic organic polymer with the chloromethyldiphenyl ether and catalyst, a solution of about 1 part chloromethyldiphenyl ether and catalyst in 3–10 parts of a C$_1$–C$_3$ chlorinated solvent is preferred. Normally about 0.1–5.0 weight percent catalyst based on chloromethyldiphenyl ether is sufficient. Particularly effective results are obtained with a solution of 1 part chloromethyldiphenyl ether, 0.02–0.04 part FeCl$_3$ or SnCl$_4$, and about 4–6 parts methylene chloride.

Thereafter rapid in situ polymerization of the chloromethyldiphenyl ether is obtained by heating the impregnated product at 80°–120° C., preferably at 90°–115° C., for a time suitable to obtain substantially complete polymerization. The rate of polymerization depends both on the catalyst concentration and temperature, but at 90°–115° C. is usually substantially complete in less than 10 minutes. With 0.02–0.04 part FeCl$_3$ or SnCl$_4$ per part chloromethyldiphenyl ether, optimum results are obtained by polymerizing at 100°–105° C. for 1–5 minutes.

Functional groups

When the chloromethyldiphenyl ether contains more than about 1.1–1.2 chloromethyl groups per molecule, unreacted chloromethyl groups often remain when the in situ polymerization is substantially complete. Although the in situ polymerization of the chloromethyldiphenyl ether alone gives a product with enhanced chemical resistance, it is usually desirable to react any residual chloromethyl groups by amination or other chemical means to prevent further polymerization or to incorporate other useful functional groups into the product.

On a weight or volume basis, the actual ion-exchange or other functional capacity which can be obtained even after the in situ polymerization of a highly chloromethylated diphenyl ether is relatively low, e.g., perhaps 0.01–1.0 meq./g. for a fabric or film coated with about 15–20 weight percent polymerized chloromethyldiphenyl ether. Yet it can significantly influence the final properties of the treated polymer. For example, amination with trimethylamine of a cotton percale treated with CMDPE–33 markedly improves the hand of the modified fabric. Amination with dimethyldodecylamine noticably increases the resistance to aqueous acid because of the hydrophobic nature of the long chain alkyl group.

To neutralize the residual chloromethyl groups, reaction with a $C_1$–$C_{15}$ alkylamine, and preferably quaternization with a tertiary alkylamine, such as trimethylamine or dimethyldodecylamine, is most convenient. Such amination is readily obtained by contacting the product with an aqueous solution of the alkylamine at room temperature as commonly employed in the preparation of ion-exchange resins.

Other useful functional groups can be incorporated into the modified products by reaction of the residual chloromethyl groups with other organic amines or with an organic sulfide to form cationic amino, ammonium or sulfonium derivatives using techniques developed for the preparation of ion-exchange resins. Among the reactants which form cationic derivatives, $C_1$–$C_{15}$ alkyl amines such as methylamine, trimethylamine, dimethylaminoethanol, and dimethyldodecylamine, and $C_2$–$C_6$ dialkyl sulfides such as dimethyl sulfide, di-n-propyl sulfide, and bis-(2-hydroxyethyl) sulfide are preferred.

Alternately the residual chloromethyl groups can be reacted with sodium iminodiacetate or other amino acids to provide a chelate exchange capacity or with such inorganic salts as sodium sulfite, sodium cyanide or potassium thiocyanide to give anionic derivatives. Since the substrate coated or impregnated with the polymerized chloromethyldiphenyl ether is resistant to attack by strong acid, anionic derivatives can also be obtained by sulfonation of the diphenyl ether groups.

Considerable flexibility is inherent in the present process. The relative ease of the treatment with the chloromethyldiphenyl ether and the subsequent in situ polymerization coupled with the remarkable chemical resistance of the resulting modified cellulosic or synthetic organic polymer makes it highly useful. To illustrate further the present invention and its advantages, the following examples are given. Unless otherwise specified, all parts and percentages are by weight.

Example 1.—Polyethylene filter cloth

A. A piece of filter cloth prepared from polyethylene monofilament was dipped at room temperature in a solution of 10 parts of a chloromethyldiphenyl ether containing 33.1% Cl and having a composition similar to that of CMDPE–33 in Table 1, 0.5 part of $FeCl_3$ in 0.5 part of methanol, and 40 parts of methylene chloride. The excess solution was squeezed out and the retained CMDPE was polymerized by heating the cloth for 5 minutes at about 110° C. As polymerization occurred the color of the cloth changed to a fairly deep red. Then the coated polyethylene was aminated by immersion for 10–20 minutes at room temperature in a mixture of 100 parts of 25% aqueous trimethylamine and 10 parts of methylene chloride. During amination the color of the cloth changed to light yellow. Based on the weight increase after drying, the polyethylene cloth contained about 15% of the polymerized and aminated diphenyl ether. Titration indicated a quaternary ammonium capacity of about 0.25–0.5 meq./g. dry weight.

The treated filter cloth was flexible and strong even when dry. Repeated washing and flexing failed to dislodge the polymer. Examined under a microscope, each strand of polyethylene appeared to have a uniform coating of polymerized chloromethyldiphenyl ether. A sample of the aminated polyethylene filter cloth was essentially unaffected by refluxing for 3 weeks in 30 percent nitric acid. A piece of the original untreated polyethylene filter cloth dissolved in about 30 minutes under the same conditions.

B. Another sample of the polyethylene filter cloth was treated in a similar manner with CMDPE–17 containing about 1.10 chloromethyl groups per molecule. After polymerizing the CMDPE at 110°–115° C., the residual chloromethyl content was less than 0.01 meq./g. This treated polyethylene cloth was resistant to prolonged heating with 30 percent nitric acid and was unaffected by contact with 50 percent sodium hydroxide. Treatment with chlorosulfonic acid at 80°–100° C. resulted in sulfonation of the polymerized chloromethyldiphenyl ether to give a product having a cation exchange capacity of about 0.5 meq./g.

Example 2.—Polyurethane foam

A piece of commercial flexible polyurethane foam was completely immersed in a mixture of 10 parts CMDPE–33, 2.5 parts of a 50 percent solution of anhydrous ferric chloride in methanol, and 30 parts methylene chloride. The excess liquid was squeezed out of the sponge which was then heated with an infrared lamp at about 110° C. for three minutes. Polymerization of the CMDPE was substantially complete.

To remove residual chloromethyl groups the sponge was immersed at room temperature in a mixture of 100 parts of 25% aqueous trimethylamine and 10 parts methylene chloride. After a half hour the foam was removed from the aqueous amine, washed thoroughly with water and dilute acid. The air-dried, flexible aminated polyurethane sponge had an ion-exchange capacity of 1.0 meq./g. dry weight basis. Qualitative tests indicated improved acid and base resistance.

Example 3.—Nylon fabric

A. A nylon fabric was treated with CMDPE–33 and trimethylamine as described in Example 1. Based on the weight increase after amination, a coating of about 4–5 weight percent was obtained. This treated nylon cloth showed substantially no sign of degradation after three weeks' reflux with 30 percent aqueous nitric acid while the untreated cloth dissolved in about 15 minutes.

B. Another piece of nylon cloth containing a surface coating of polymerized CMDPE–33 was aminated with dimethyldodecylamine. The surface of the resulting nylon had increased water repellancy and also showed good resistance to acid and base.

In like manner fabrics and films of polypropylene, Mylar, saran, and Dacron have been treated by the in situ polymerization of a chloromethyldiphenyl ether to obtain coated products having greatly increased resistance to degradation in contact with strong acid or base.

Example 4.—Cotton percale

A. A piece of cotton percale was soaked for several minutes at room temperature in a 20% aqueous solution of sodium carbonate. After drying at 90°–100° C. in an air oven, this pretreated cloth contained about 2.2 weight percent $Na_2CO_3$. It was then immersed in a solution of 10 parts CMDPE–33, 0.2 part anhydrous $FeCl_3$ dissolved in 0.2 part methanol, and 60 parts methylene chloride. The excess CMDPE solution was squeezed out and the residual CMDPE polymerized by heating the treated cloth for 3 to 5 minutes in an oven at 100° C. The resulting cloth was light yellow-brown in color and somewhat stiffer in hand. It contained about 18% polymerized CMDPE and had a residual reactive chloromethyl content of about 0.4 meq./g.

A portion of the treated percale was aminated by immersing in 20% aqueous trimethylamine for 10 to 15 minutes at room temperature. The sample was then washed thoroughly with water and dried. The dried cloth was light yellow in color, had a much softer hand and a quaternary ammonium content of about 0.4 meq./g., dry weight basis. Samples of this aminated cloth were taken through 6 soap and water wash cycles without noticeable decrease in ion-exchange capacity or acid resistance.

In a similar manner another sample of the CMDPE treated percale was aminated with dimethyldodecylamine. There was a visible increase in the water repellancy of this cloth compared with that aminated with trimethylamine and it had excellent acid resistance.

B. Another piece of cotton percale weighing 10.194 g. was pretreated with sodium carbonate as described in Example 4A. The dried cloth containing 0.227 g. (2.2 weight percent) of $Na_2CO_3$ was immersed in a solution of 30 g. CMDPE-17, 3 g. of a 50 percent solution of $FeCl_3$ in methanol, and 240 g. methylene chloride. After squeezing out excess CMDPE solution, the impregnated cloth was heated at 105° C. for 10 minutes. The recovered cloth weighed 12.142 g., the polymer pickup being about 18%.

A 0.559 g. strip of the treated cloth was aminated at room temperature with 20% aqueous trimethylamine. The weight increase after drying was about 0.090 g. The aminated sample was lighter in color and had good flexibility.

Another strip of the treated cloth was aminated with dimethyldodecylamine with a weight increase of 0.067 g. This sample had an obvious increase in water repellency.

C. To test the acid resistance of treated cellulosic textile products, sample strips measuring about 3.0 x 17.5 cm. were stretched horizontally between two clamps and held under tension by a 0.45 kg. weight attached to one clamp by a wire and pulley arrangement. A thin band of concentrated sulfuric acid was then applied across the sample strip near its midpoint and the time for a sample to break was determined. Samples were run in duplicate with a control blank of untreated cloth.

Typical results for a number of cotton fabrics treated as described in Examples 4A and 4B are given in Table 2.

Example 5.—Paper

A. Samples of a variety of paper products including corrugated cardboard, a soft finished cardboard, white note paper, paper toweling, and a single layer of Kleenex tissue were individually dipped into a solution of 50 parts CMDPE-32, 5 parts of 50% methanolic $FeCl_3$, and 400 parts of methylene chloride. The test pieces were drained of excess CMDPE solution and heated under an infrared lamp at 100°–110° C. for 3–5 minutes. Then they were aminated by shaking with a 20% aqueous solution of dimethyldodecylamine for 30 minutes at room temperature. Finally the pieces were washed with water and dried. Apart from a tan to yellow brown color, the paper strips retained their original appearance in form and texture. Similar results are obtained with samples pretreated with aqueous $Na_2CO_3$ as an HCl acceptor, except that these pieces seemed qualitatively to be somewhat stronger.

B. To test the acid resistance of the treated paper samples, test strips were shaken with concentrated sulfuric acid at room temperature. Untreated paper and cardboard strips blackened and disintegrated in less than 2 minutes. The treated samples recovered after 10–15 minutes and washed with water in all cases retained their original shape and appearance and much of the initial strength. A piece of the treated paper toweling had a breaktime of 3 minutes.

C. A piece of paper toweling was immersed in a solution of 30 parts CMDPE-32 and about 1 part of methanolic $FeCl_3$ in 120 parts methylene chloride, the excess solution drained, and the retained CMDPE polymerized in situ at 100–110° C. When tested with concentrated $H_2SO_4$ as described in Example 4C, the untreated toweling failed in 1.2 seconds while the treated toweling did not part until 3 minutes and 38 seconds. In another similar test, the blank paper failed in 11 seconds while the treated paper failed only after 11 minutes and 54 seconds.

Example 6.—Process conditions

A. A variety of basic inorganic compounds including sodium bicarbonate, sodium hydroxide, and sodium carbonate were tested as HCl acceptors in the pretreatment of cotton fabrics. Best results were achieved using a 10–20% aqueous solution of sodium carbonate or about a 5% solution of sodium hydroxide. With 20% sodium hydroxide, caustic burning of the fabric was encountered during the treatment.

B. In laboratory tests, the CMDPE solution was generally applied by dipping the test piece into the solution or by brushing the solution onto its surface. The CMDPE pick-up was controlled primarily by the concentration of CMDPE in the solution. Optimum results were obtained

TABLE 2.—ACID RESISTANCE TEST

| Sample: | Fabric | Treatment | Break time |
|---|---|---|---|
| A-1 | Cotton percale | None | 1–2 min. |
| A-2 | do | CMDPE-33 | >2 hrs. |
| A-3 | do | CMDPE-33+trimethylamine | >2 hrs. |
| A-4 | do | CMDPE-33+dimethyldodecylamine | >2 hrs. |
| B-1 | do | None | 2.3 min. |
| B-2 | do | CMDPE-17 | 5.8 min. |
| B-3 | do | CMDPE-17+trimethylamine | 20.4 min. |
| B-4 | do | CMDPE-17+dimethyldodecylamine | >90 min. |
| C-1 | Cotton twill | None | 2–3 min. |
| C-2 | do | CMDPE-33+trimethylamine | >1 hr. |

D. To demonstrate the resistance of the modified cellulosic textile product to concentrated caustic, a sample of percale treated with CMDPE-33 and trimethylamine as described in Example 4A was shaken with 30 percent cautsic for 10 minutes. Then it was removed and washed with water. The tensile strength of the sample was unimpaired. In contrast, a piece of untreated cotton percale under similar condition was so severely weakened that it disintegrated while rinsing with water.

with about 5–6 parts solvent per part CMDPE. With less solvent, a thick stiff and uneven coating of polymer resulted.

C. Catalyst ratios ranging from 0.005–0.10 part per part CMDPE have been examined using polymerization temperatures of about 90–115° C. Results, such as shown in Table 3 using a cotton percale test fabric, indicate that 0.02–0.04 part per part CMDPE is preferred with $FeCl_3$ or $SnCl_4$ catalysts. With a lower catalyst concentration of a less active catalyst a longer period is required to achieve adequate polymerization and degradation of the fabric with marked decrease in the fabric strength can occur.

TABLE 3.—FeCl₃ CATALYST RATIO

| FeCl₃ Ratio:[1] | T., °C. | Time | Result |
|---|---|---|---|
| 0.005 | 100 | 15 min | Fabric too weak for amination. |
| 0.01 | 100 | 13–14 min | Fabric weak, some acid resistance. |
| 0.02 | 100 | 1–2 min | Good strength and acid resistance. |
| 0.04 | 100 | 1 min | Excellent strength and acid resistance. |
| 0.06–0.10 | 100 | 1 min | Do. |

[1] Parts FeCl₃/part CMDPE.

We claim:

1. A process for improving the chemical resistance of a solid cellulosic or synthetic organic polymer which comprises:
   (A) treating the solid cellulosic or synthetic organic polymer substrate with a solution of 1 part of a chloromethyldiphenyl ether containing an average of about 1.0–4.0 chloromethyl groups per molecule and a catalytic amount of a Lewis acid catalyst in a $C_1$–$C_3$ chlorinated aliphatic solvent, and
   (B) heating the treated solid substrate to polymerize the chloromethyldiphenyl ether in situ thereby forming an acid resistant coating on the treated substrate.

2. The process of claim 1 wherein the chloromethyldiphenyl ether solution consists essentially of 1 part chloromethyldiphenyl ether, 0.02–0.04 part anhydrous FeCl₃ or SnCl₄, and 3–10 parts of a $C_1$–$C_3$ chlorinated aliphatic solvent.

3. The process of claim 2 wherein the solvent is methylene chloride.

4. The process of claim 1 wherein after the in situ polymerization of the chloromethyldiphenyl ether, the treated polymer is reacted with an organic amine, an organic sulfide, or a sulfonating agent to incorporate functional anionic or cationic groups.

5. The process of claim 4 wherein the treated polymer is aminated with a $C_1$–$C_{15}$ alkylamine.

6. The process of claim 4 wherein the treated polymer is sulfonated with chlorosulfonic acid.

7. The process of claim 5 wherein the treated polymer is a polyethylene, polyamide or polyurethane.

8. The process of claim 1 wherein the cellulosic or synthetic organic polymer is pretreated with a water-soluble inorganic HCl acceptor.

9. A solid polymeric product having an ion-exchange capacity of at least 0.01 meq./g. prepared by the process of claim 4.

10. A solid cellulosic product having an ion-exchange capacity of at least 0.01 meq./g. prepared by the process of claim 5.

References Cited

UNITED STATES PATENTS

| 2,911,380 | 11/1959 | Doedens | 260—47 |
| 3,082,185 | 3/1963 | Doedens et al. | 260—33.8 |
| 3,115,383 | 12/1963 | Tesoro | 8—116.2 |
| 3,274,157 | 9/1966 | Doedens | 260—47 |
| 3,278,462 | 10/1966 | Anderson et al. | 260—47 |

OTHER REFERENCES

Doedens et al., Diphenyl Ether Derivatives in Condensation Polymers, Industrial and Engineering Chemistry, vol. 53, No. 1, January 1961.

WILLIAM D. MARTIN, Primary Examiner

J. E. MILLER, Assistant Examiner

U.S. Cl. X.R.

117—138, 145, 148, 155, 143, 161, 56, 62, 60